US012757882B2

(12) United States Patent
Liu

(10) Patent No.: US 12,757,882 B2
(45) Date of Patent: Oct. 13, 2026

(54) STORAGE BOX HAVING STORAGE STRUCTURES FOR FISHING EQUIPMENT

(71) Applicant: Rapala VMC Oyj, Helsinki (FI)

(72) Inventor: Meng Da Liu, Inver Grove Heights, MN (US)

(73) Assignee: Rapala VMC Oyj, Helsinki (FI)

( * ) Notice: Subject to any disclaimer, the term of this patent is extended or adjusted under 35 U.S.C. 154(b) by 0 days.

(21) Appl. No.: 18/521,211

(22) Filed: Nov. 28, 2023

(65) Prior Publication Data

US 2025/0169483 A1 May 29, 2025

(51) Int. Cl.

| | |
|---|---|
| ***A01K 97/06*** | (2006.01) |
| ***B65D 1/34*** | (2006.01) |
| ***B65D 25/10*** | (2006.01) |
| ***B65D 43/16*** | (2006.01) |

(52) U.S. Cl.

CPC ................ *A01K 97/06* (2013.01); *B65D 1/34* (2013.01); *B65D 25/10* (2013.01); *B65D 43/163* (2013.01); *B65D 2543/00194* (2013.01)

(58) Field of Classification Search

CPC ................................ A01K 97/06; B65D 25/04
USPC ................ 43/57.1; 206/315.11, 6.1; 224/922
See application file for complete search history.

(56) References Cited

U.S. PATENT DOCUMENTS

| | | | | |
|---|---|---|---|---|
| 840,558 A | | 1/1907 | Denmead | |
| 1,482,678 A | * | 2/1924 | Figley | A01K 97/06 43/57.1 |
| 1,755,903 A | * | 4/1930 | Townsend | A01K 97/06 43/57.1 |
| 1,815,568 A | * | 7/1931 | Jacqmein | A01K 97/06 206/315.11 |
| 2,364,807 A | * | 12/1944 | Nelson, Jr. | A01K 97/06 206/315.11 |
| 2,846,806 A | * | 8/1958 | Gaines | A01K 97/06 206/315.11 |
| 2,879,619 A | * | 3/1959 | Peterson | A01K 97/16 43/57.2 |
| 3,507,071 A | * | 4/1970 | Bryson | A01K 97/06 43/57.1 |
| 3,512,295 A | * | 5/1970 | Barge | A01K 97/06 43/57.1 |
| 4,238,901 A | * | 12/1980 | Martinet | A01K 97/06 D6/552 |
| 4,838,445 A | | 6/1989 | Lanius | |
| 5,386,662 A | * | 2/1995 | Vader | A01K 97/06 206/315.11 |

(Continued)

FOREIGN PATENT DOCUMENTS

| | | |
|---|---|---|
| CN | 107249378 A | 10/2017 |
| TW | M478591 U | 5/2014 |

*Primary Examiner* — Joshua J Michener
*Assistant Examiner* — Nicole Paige MacCrate
(74) *Attorney, Agent, or Firm* — Dority & Manning, P.A.

(57) ABSTRACT

A lure storage apparatus includes a main body that has a first surface and a second surface. A slot is defined in the main body and extends from an opening in one of first surface or the second surface towards the other of the first surface or the second surface to a closed end. The slot is partially defined by a first boundary surface and a second boundary surface. The main body includes a plurality of protrusions that each extend from a base at one of the first boundary surface or the second boundary surface towards the other of the first boundary surface or the second boundary surface to an end wall.

8 Claims, 11 Drawing Sheets

(56) References Cited

U.S. PATENT DOCUMENTS

| | | | | | |
|---|---|---|---|---|---|
| 5,553,710 | A | | 9/1996 | Takama | |
| 5,605,167 | A | | 2/1997 | Montoli | |
| 6,079,148 | A | * | 6/2000 | Yonenoi | A01K 97/06 43/57.1 |
| 6,219,958 | B1 | * | 4/2001 | Eberts | A01K 97/06 43/57.2 |
| 6,315,154 | B1 | | 11/2001 | Newby, Sr. | |
| 7,121,407 | B2 | | 10/2006 | Hurt et al. | |
| 7,357,250 | B2 | | 4/2008 | Hagemann et al. | |
| 7,552,560 | B2 | | 6/2009 | Hoover | |
| 8,607,499 | B2 | | 12/2013 | Hoover | |
| 9,913,463 | B2 | | 3/2018 | Aston et al. | |
| 10,206,385 | B2 | * | 2/2019 | Preller, Jr. | A01K 97/12 |
| 10,206,505 | B2 | | 2/2019 | Qualkinbush | |
| 10,299,468 | B2 | | 5/2019 | Aston et al. | |
| 10,694,731 | B2 | | 6/2020 | Aston et al. | |
| 10,722,012 | B2 | | 7/2020 | Kraus et al. | |
| D943,274 | S | | 2/2022 | Tortorella, Jr. | |
| 11,503,910 | B1 | | 11/2022 | Carmen | |
| 2004/0256260 | A1 | * | 12/2004 | Lin | A01K 97/06 206/315.11 |
| 2005/0051444 | A1 | * | 3/2005 | Hurt | A01K 97/06 206/315.11 |
| 2009/0321456 | A1 | * | 12/2009 | Yang | B65D 5/509 428/167 |
| 2010/0126814 | A1 | | 5/2010 | Sternberg | |
| 2011/0214336 | A1 | * | 9/2011 | Hoover | A01K 97/06 43/54.1 |
| 2016/0205913 | A1 | | 7/2016 | Aston et al. | |
| 2018/0007884 | A1 | * | 1/2018 | Langley | B65D 43/12 |
| 2018/0042209 | A1 | | 2/2018 | Aston et al. | |
| 2019/0009403 | A1 | | 1/2019 | Huang | |
| 2021/0153488 | A1 | * | 5/2021 | White | A01K 97/06 |
| 2022/0225743 | A1 | | 7/2022 | Sutton | |
| 2023/0011990 | A1 | | 1/2023 | Makos | |
| 2024/0164361 | A1 | * | 5/2024 | Dollahite | A01K 97/06 |
| 2025/0019120 | A1 | * | 1/2025 | Kim | A01K 97/06 |

* cited by examiner

STORAGE BOX HAVING STORAGE STRUCTURES FOR FISHING EQUIPMENT

FIELD

The present disclosure relates generally to specialized storage structures for fishing equipment. More specifically, the present disclosure relates to specialized storage structures being configured for the storage of equipment, such as fishing lures, such as jigs, spinners, and/or weights.

BACKGROUND

Storage boxes (such as tackle boxes) are utilized by anglers for storing their fishing lures and keeping them organized. Storage boxes typically feature multiple compartments and dividers, allowing anglers to categorized and separate different types and sizes of lures, which helps prevent tangling while maintaining organization and accessibility. However, problems exist with the design of many known storage boxes. For example, fishing lures have a variety of specialized sizes, shapes, and geometries that make them suitable for use in different fishing environments. Without proper storage structures for these specialized lures, the lures being stored inefficiently, resulting in wasted space and possible disorganization. Accordingly, an improved storage box, having specialized storage structures that are useful for accommodating specialized lures, hooks, and/or fishing weights, is desired and would be welcomed and useful.

BRIEF DESCRIPTION

Aspects and advantages of the lure storage apparatuses, weight storage trays, and storage boxes in accordance with the present disclosure will be set forth in part in the following description, or may be obvious from the description, or may be learned through practice of the technology.

In accordance with one embodiment, a lure storage apparatus is provided. The lure storage apparatus includes a main body that has a first surface and a second surface. A slot is defined in the main body and extends from an opening in one of first surface or the second surface towards the other of the first surface or the second surface to a closed end. The slot is partially defined by a first boundary surface and a second boundary surface. The main body includes a plurality of protrusions that each extend from a base at one of the first boundary surface or the second boundary surface towards the other of the first boundary surface or the second boundary surface to an end wall.

In accordance with another embodiment, a weight storage tray is provided. The weight storage tray includes a tray body that includes a plurality of walls that define a cavity. The plurality of walls include a base wall. The weight storage tray further includes a weight coupling apparatus that extends from the base wall of the tray body and is disposed at least partially within the cavity. The weight coupling apparatus includes a mounting base coupled to the base wall. The weight coupling apparatus further includes a pin that extends from the mounting base to a free end.

In accordance with yet another embodiment, a storage box is provided. The storage box includes a container that defines an interior. The storage box further includes a lid coupled to the container. The storage box further includes a lure storage apparatus coupled to the container within the interior. The lure storage apparatus includes a main body that has a first surface and a second surface. A slot is defined in the main body and extends from an opening in one of first surface or the second surface towards the other of the first surface or the second surface to a closed end. The slot is partially defined by a first boundary surface and a second boundary surface. The main body includes a plurality of protrusions that each extend from a base at one of the first boundary surface or the second boundary surface towards the other of the first boundary surface or the second boundary surface to an end wall.

These and other features, aspects and advantages of the present lure storage apparatuses, weight storage trays, and storage boxes will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present lure storage apparatuses, weight storage trays, and storage boxes, including the best mode of making and using the present systems and methods, directed to one of ordinary skill in the art, is set forth in the specification, which makes reference to the appended figures, in which.

DETAILED DESCRIPTION

Figure 1:
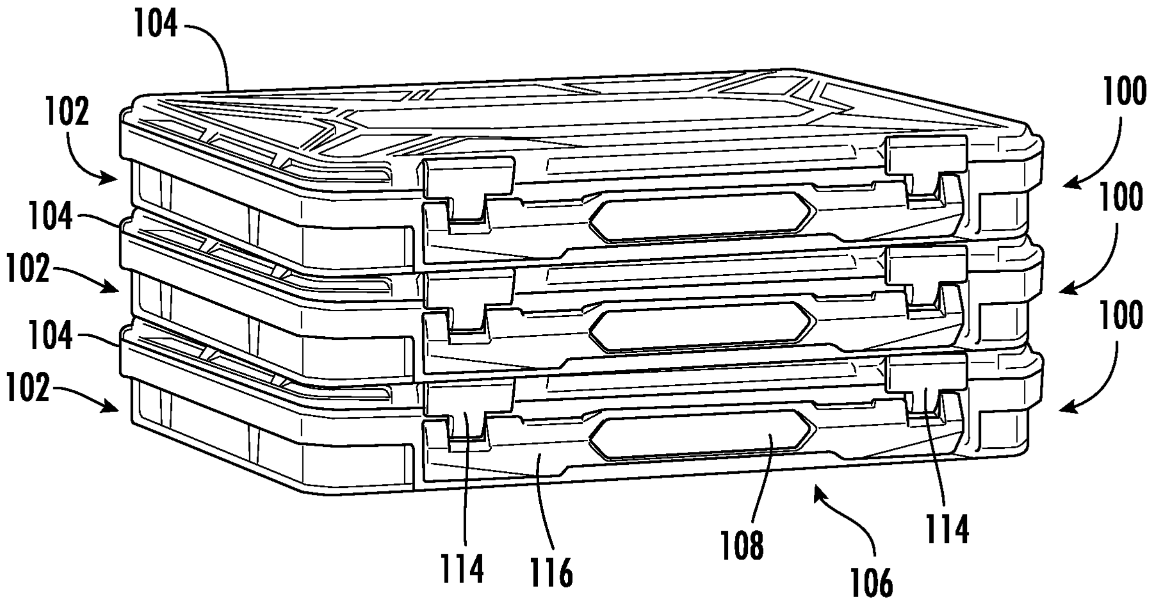
FIG. 1 is a perspective view of a plurality of storage boxes stacked together in accordance with various aspects of the present disclosure.

Reference now will be made in detail to embodiments of the present lure storage apparatuses, weight storage trays, and storage boxes, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
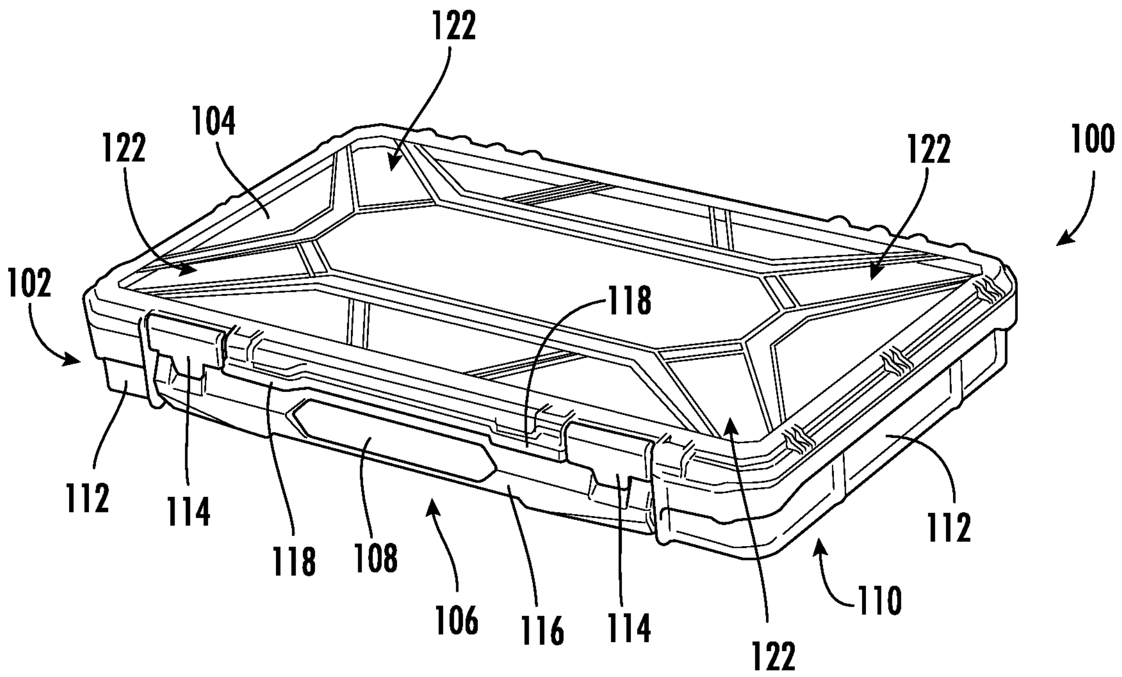
FIG. 2 illustrates a top perspective view of a storage box in a closed position in accordance with embodiments of the present disclosure.
Figure 3:
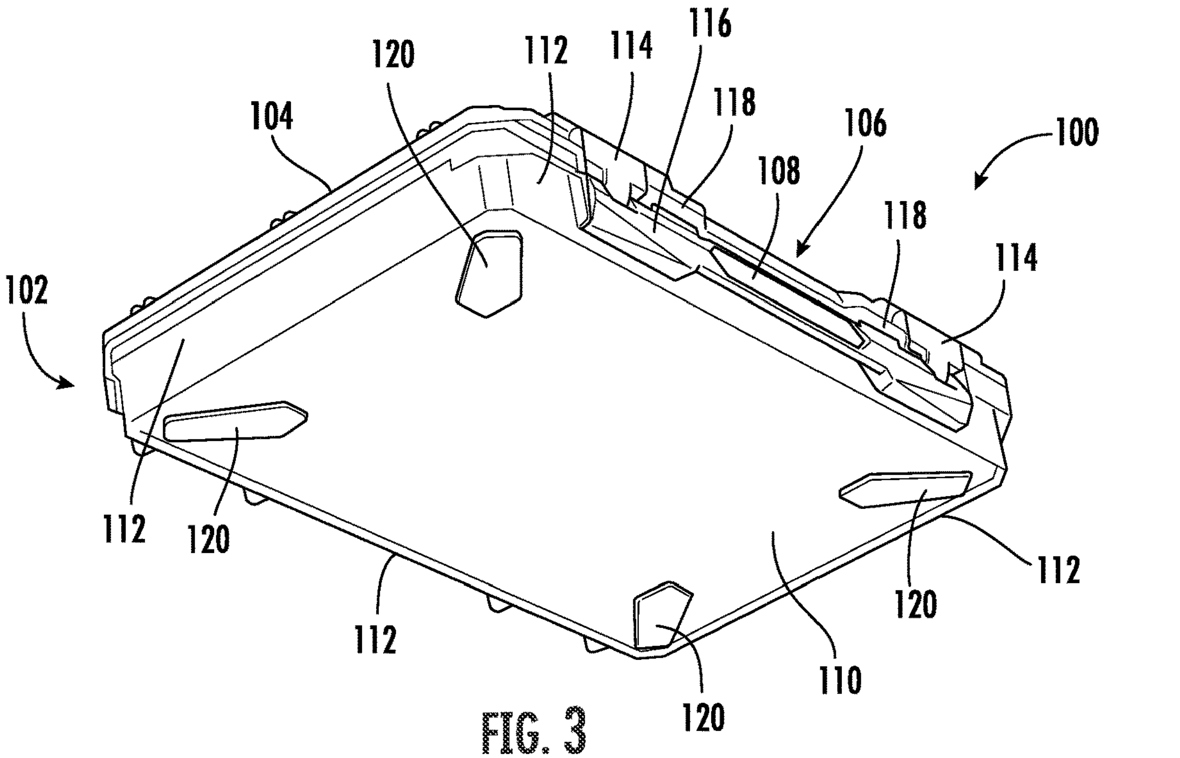
FIG. 3 illustrates a bottom perspective view of a storage box in a closed position in accordance with embodiments of the present disclosure.
Figure 4:
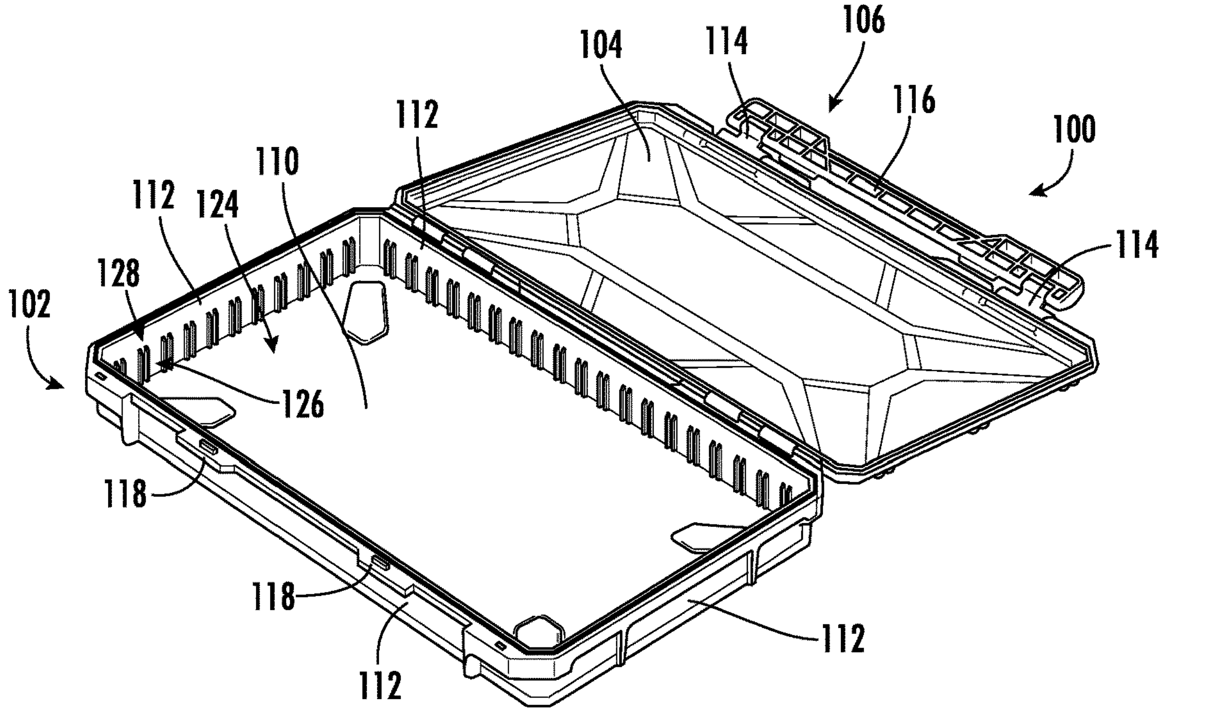
FIG. 4 illustrates a top perspective view of a storage box in an open position in accordance with embodiments of the present disclosure.
Figure 5:
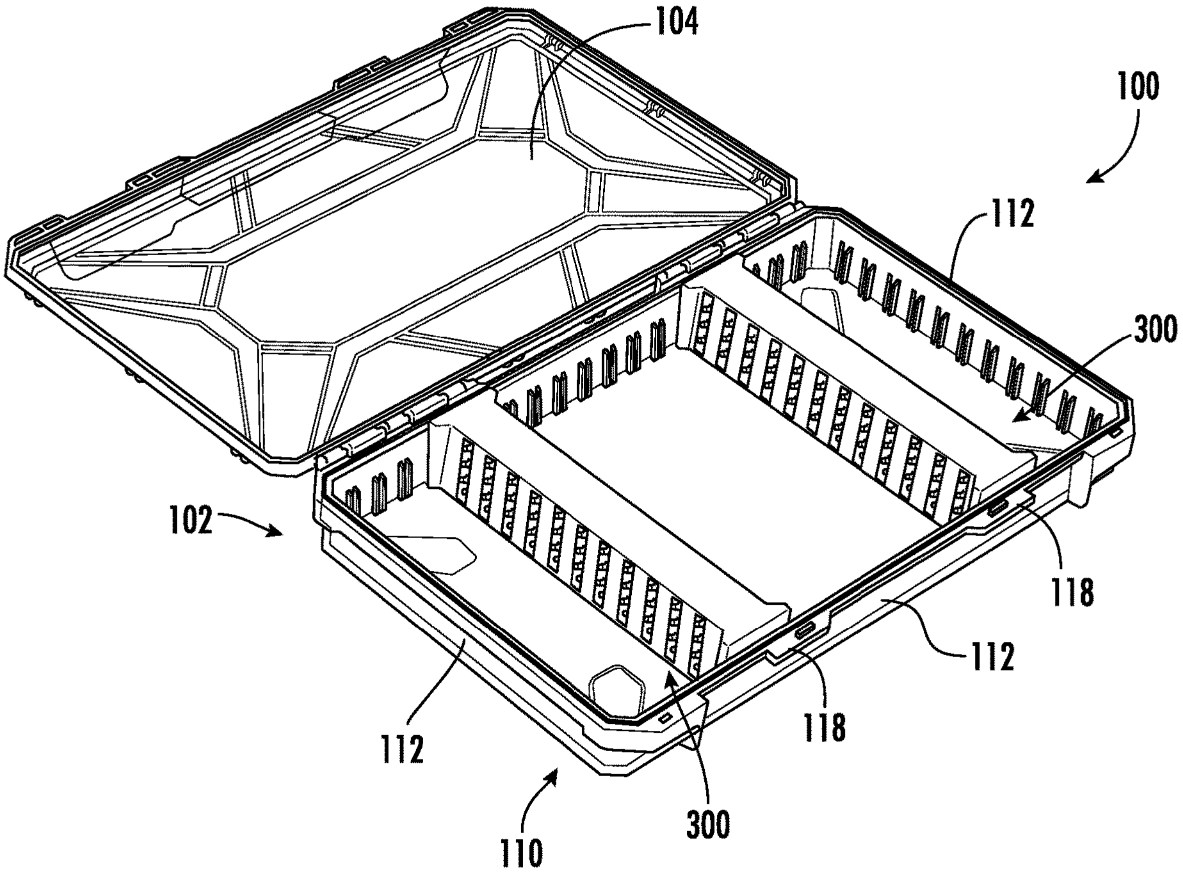
FIG. 5 illustrates a top perspective view of the storage box in an open position, in which a plurality of lure storage apparatuses have been positioned therein, in accordance with embodiments of the present disclosure.

Referring now to the drawings, FIG. 1 is a perspective view of a plurality of storage boxes 100 stacked together, and FIGS. 2 through 5 illustrate various views of a single storage box 100 in accordance with embodiments of the present disclosure. Particularly, FIG. 2 illustrates a top perspective view of the storage box 100 in a closed position; FIG. 3 illustrates a bottom perspective view of the storage box 100 in a closed position; FIG. 4 illustrates a top perspective view of the storage box in an open position; and FIG. 5 illustrates another top perspective view of the storage box 100 in an open position, in which a plurality of lure storage apparatuses 300 have been positioned therein. In exemplary embodiments, each of the storage boxes 100 may be configured as tackle boxes sized and configured for the storage of fishing equipment, lures, hooks, etc.

As shown in FIGS. 1 through 5, the storage box 100 may include a container 102 and a lid coupled to the container 102. The lid 104 may be movable relative to the container 102 between an open position and a closed position. Each storage box 100 may further include a latch assembly 106 that is coupled to the lid 104. The latch assembly 106 may include one or more hinges 114 coupled to the lid 104 and a handle 116 rotatably coupled to the one or more hinges 114, such that the handle 116 is rotatable relative to the lid 104. When in a closed position, the handle 116 may be positioned under one or more protrusions 118 extending from the container 102, such that the lid 104 remains closed unless a force is applied to the handle 116 to move the lid 104 such that the storage box 100 is in the open position. Additionally, the handle 116 may include a re-writable label 108, which may be marked by the user (e.g., using a writing utensil such as a marker) to indicate what is stored within the storage box 100. Serving as a few non-limiting examples, as shown, the re-writable label 108 may be marked "VMC RedLine," "CrushCity," or "Jerkbait" to indicate the contents stored within each of the storage boxes 100.

The container 102 may include a base 110 and four boundary walls 112 extending generally perpendicularly from the base 110. As shown in FIG. 3, the base 110 of the container 102 may include one or more feet 120 protruding from the base 110. As shown in FIG. 2, the lid 104 may define one or more recesses 122 corresponding in number, size, shape, and location to the feet 120 on the base 110.

As shown in FIGS. 4 and 5, the container 102 (e.g., the base 110 and the boundary walls 112) may define an interior 124. When in the closed position (FIG. 2), the lid 104 may couple to the boundary walls 112 to enclose the interior 124 such that the contents of the interior 124 are encapsulated and cannot be accessed. By contrast, in the open position, lid 104 may be partially decoupled from the boundary walls 112 such that the interior 124 may be accessed.

FIG. 4 illustrates the interior 124 of the container 102 without having any trays or lure storage apparatuses positioned therein, such that the details of the container may be better illustrated. As shown in FIG. 4, the boundary walls 112 may include a plurality of dovetail flanges 126 extending from a respective boundary wall 112 and into the interior 124. Each of the dovetail flanges 126 may define a dovetail slot 128, into which a dovetail 311 (FIG. 9) of a lure storage tray 200 may be inserted to couple the lure storage apparatus or tray to the container 102. As shown in FIG. 5, one or more lure storage apparatuses 300 may be positioned within the interior 124 of the container 102. The one or more lure storage apparatuses 300 may each be removably coupled to the container 102 within the interior 124, e.g., via the dovetail joint formed between the dovetail slot 128 of the container 102 and the dovetail 311 of the lure storage apparatus 300 (FIG. 9). Alternatively, or additionally, one or more lure storage apparatuses 300 may be fixedly coupled to the container 102 (or integrally formed with the container). As should be appreciated, the lure storage apparatuses 300, 400 discussed below with reference to FIGS. 6-11 and/or the weight storage tray 500 discussed below with reference to FIGS. 12 and 13 may each be removably couplable to the container 102 (e.g., via a dovetail connection). The storage apparatuses 300, 400, the weight storage tray 500, and other trays, may be arranged within the interior 124 of the container 102 in any desired combination and/or orientation.

Figure 6:
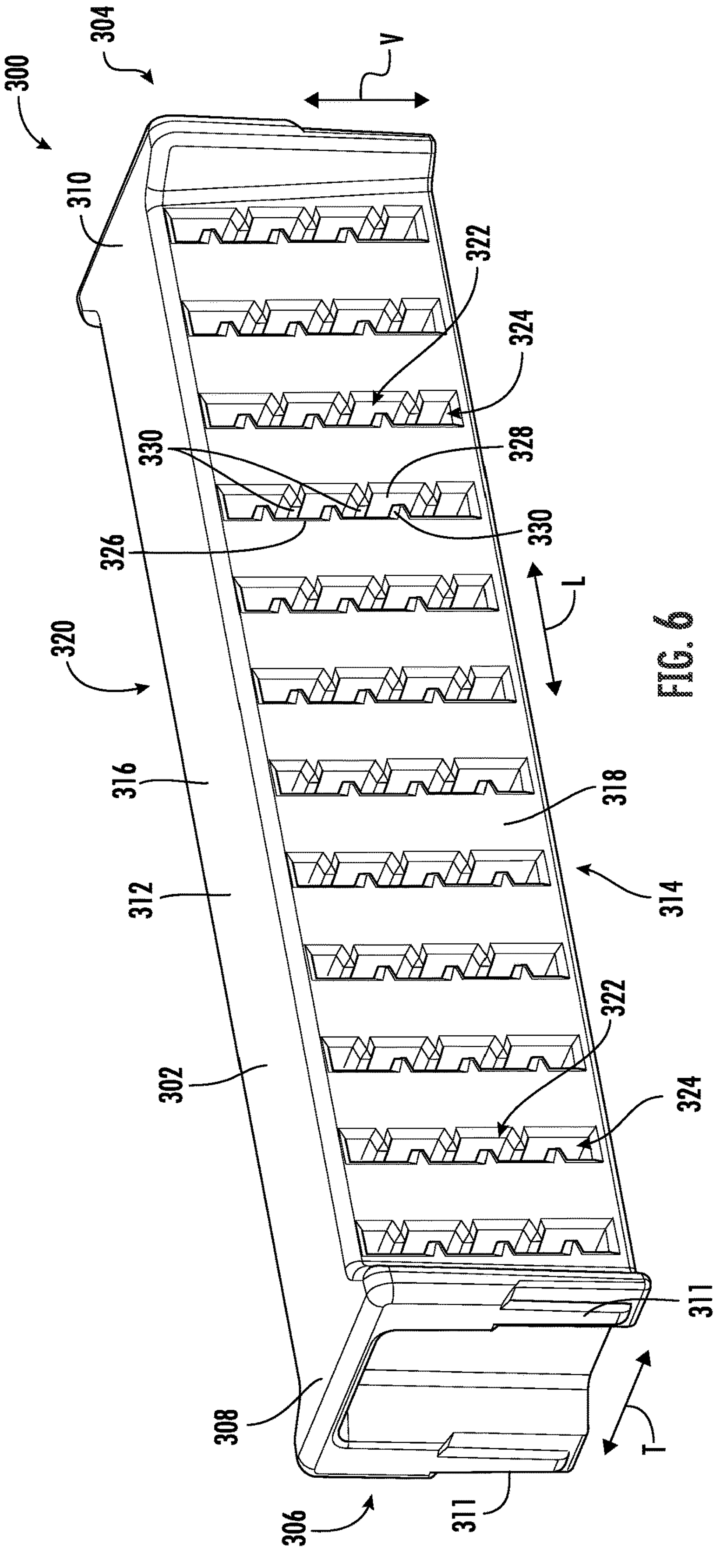
FIG. 6 illustrates a perspective view of a lure storage apparatus in accordance with embodiments of the present disclosure.

Referring now to FIG. 6, a perspective view of a lure storage apparatus 300 is illustrated in accordance with exemplary embodiments of the present disclosure. The lure storage apparatus 300 may define a cartesian coordinate system having a vertical direction V, a longitudinal direction L, and a transverse direction T mutually perpendicular to one another.

In many embodiments, the lure storage apparatus 300 the lure storage apparatus 300 may be formed from an elastic polymer material, such as rubber (e.g., silicone rubber, latex rubber, polybutadiene rubber, or others), elastomers, thermoplastic elastomers (TPEs), or others. Forming the lure storage apparatus 300 from an elastic polymer material advantageously provides for better friction between the lures/hooks and the lure storage apparatus 300, thereby preventing stored lures/hooks from sliding and/or falling out of the lure storage apparatus 300.

As shown in FIG. 6, the lure storage apparatus 300 includes a main body 302. The main body 302 may extend (generally longitudinally) between a first end 304 and a second end 306. Additionally, the main body 302 may include a first mounting flange portion 308 at the first end 304, a second mounting flange portion 310 at the second end 306, and a storage portion 312 extending between the first mounting flange portion 308 and the second mounting flange portion 310. The mounting flange portions 308, 310 may extend outwardly from the storage portion 312 of the main body 302 (e.g., in the transverse direction). The mounting flanges 308, 310 may include dovetails 311, which may be removably inserted into the dovetail slot 128 of the storage box 100 to couple the lure storage apparatus 300 to the storage box 100. The dovetails 311 may be sized and shaped to correspond with a shape of the dovetail slot 128.

The main body 302 of the lure storage apparatus 300 may extend (e.g., vertically) between a base platform 314 and a top platform 316. The base platform 314 and the top platform 316 may be generally flat and planar surfaces, which may be generally parallel to one another in many embodiments. Further, in many embodiments, the main body 302 may extend (e.g., transversely) between a first surface 318 and a second surface 320. More particularly, the storage portion 312 may extend (e.g., transversely) between a first surface 318 and a second surface 320, and the mounting flanges 308, 310 may extend transversely outwardly from the first surface 318 and a second surface 320.

In exemplary embodiments, a slot 322 may be defined the main body 302. The slot may be sized and shaped to receive special types of fishing lures, such as a bladed jig, a spinner, or other types of fishing lures. The slot 322 may extend from an opening 324 in one of first surface 318 or the second surface 320 towards the other of the first surface 318 or the second surface 320. The slot 322 may extend vertically between the base platform 314 and the top platform 316.

Particularly, in exemplary embodiments, the main body 302 may define a plurality of slots 322 each extending from an opening 324 on the first surface 318 or the second surface 320. Each of the slots 322 may be partially defined by a respective first boundary surface 326 and a second boundary surface 328, which may each extend generally vertically and transversely (e.g., within a vertical-transverse plane), and which may be longitudinally spaced apart from one another. The first boundary surface 326 and the second boundary surface 328 may be generally parallel to one another. In exemplary embodiments, the main body 302 may include a plurality of protrusions 330 each extending from one of the first boundary surface 326 or the second boundary surface 328 towards the other of the first boundary surface 326 or the second boundary surface 328.

Figure 7:
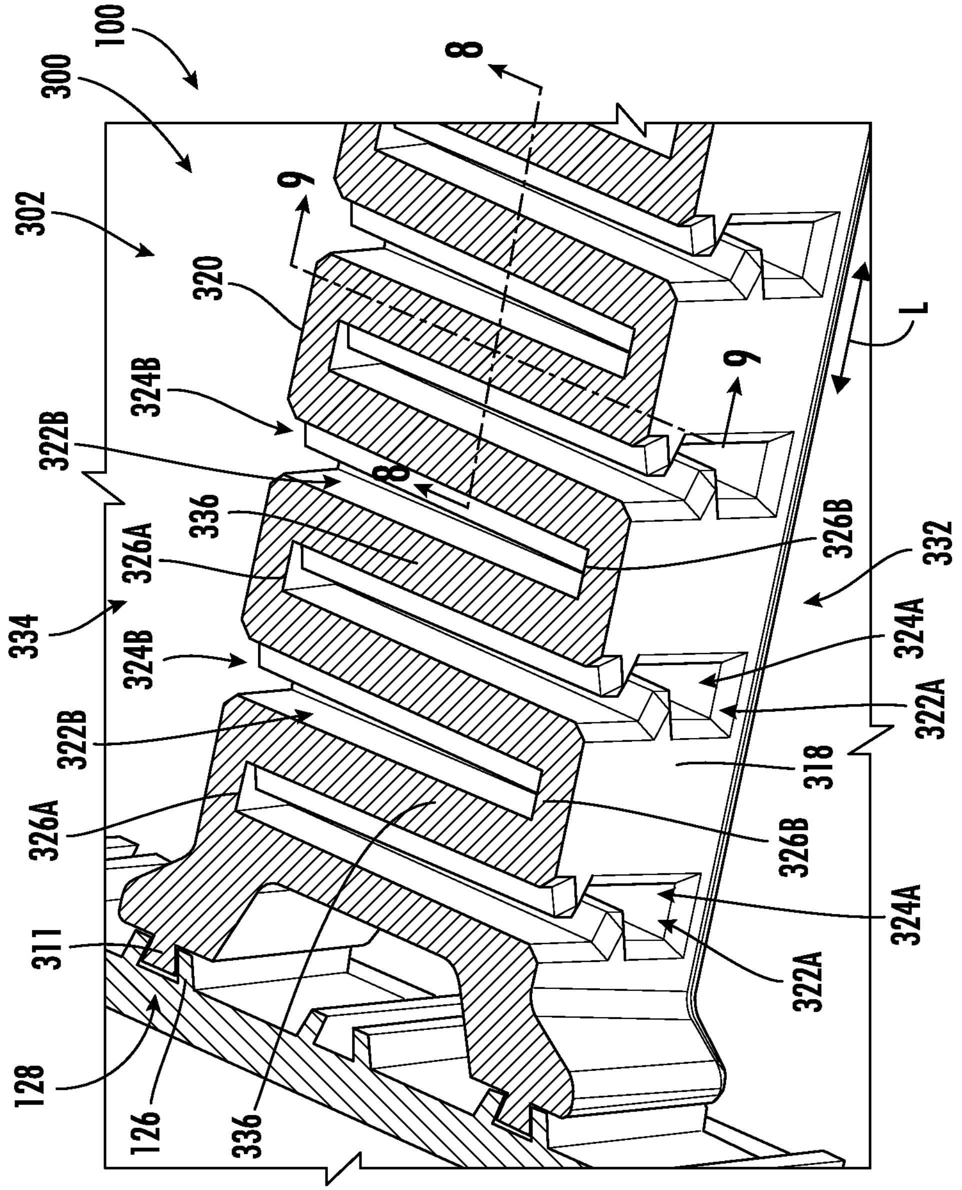
FIG. 7 illustrates a cross-sectional perspective view of a storage box having a lure storage apparatus coupled thereto in accordance with embodiments of the present disclosure.

Referring now to FIG. 7, a cross-sectional perspective view of a storage box 100 having a lure storage apparatus 300 coupled thereto is illustrated in accordance with embodiments of the present disclosure. As shown, the dovetails 311 may removably couple the lure storage apparatus 300 to the dovetail slot 128 of the storage box 100. Further, as shown in FIG. 7, the main body 302 of the lure storage apparatus 300 may define a plurality of slots 322A, 322B being arranged in a first group 332 and a second group 334 (e.g., first slots 322A and second slots 322B). Each of the first slots 322A (i.e., each of the slots in the first group 332) may extend from a first opening 324A in the first surface 318 towards the second surface 320 to a first closed end 326A. Similarly, each of the second slots 322B in the second group 334 may extend from a second opening 324B in the second surface 320 towards the first surface 318 to a second closed end 326B. In various embodiments, the first closed 326A may be generally parallel to the second surface 320, and the second close end 326B may be generally parallel to the first surface 318.

In exemplary embodiments, the first group 332 and the second group 334 may be staggered such that each of the first slots 322A in the first group 332 neighbors at least one second slot 322B in the second group 334. For example, each of the first slots 322A may be longitudinally spaced apart from at least one of the second slots 322B. In many embodiments, the main body 302 may include divider walls 336 (which may form a portion of the main body 302 and be integrally formed therewith). The divider walls 336 may partition and partially define the first slots 322A and the second slots 322B.

Figure 8:
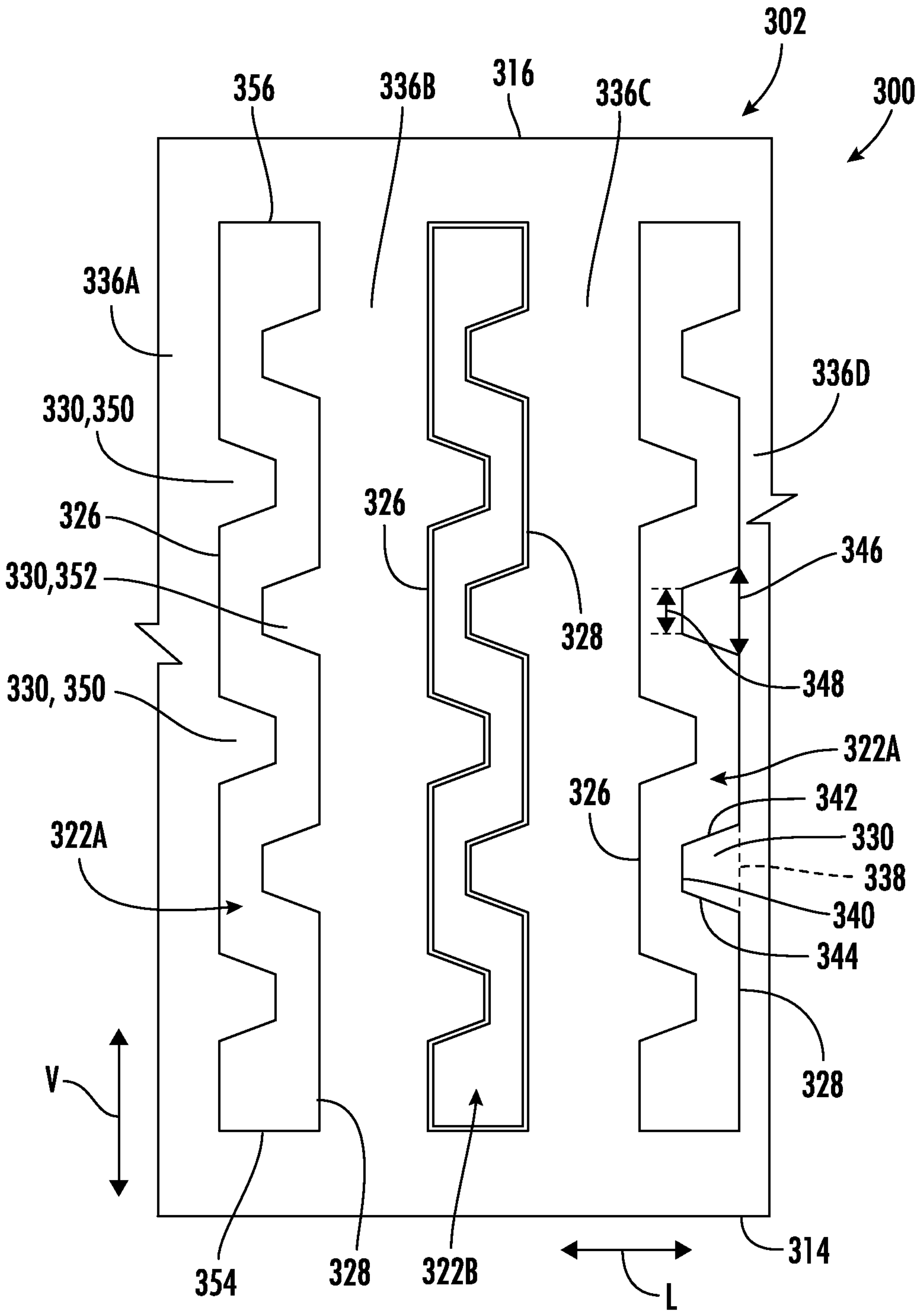
FIG. 8 illustrates a cross-sectional view of the lure storage apparatus shown in FIG. 7 from along the line 8-8 is illustrated in accordance with various aspects of the present disclosure.
Figure 9:
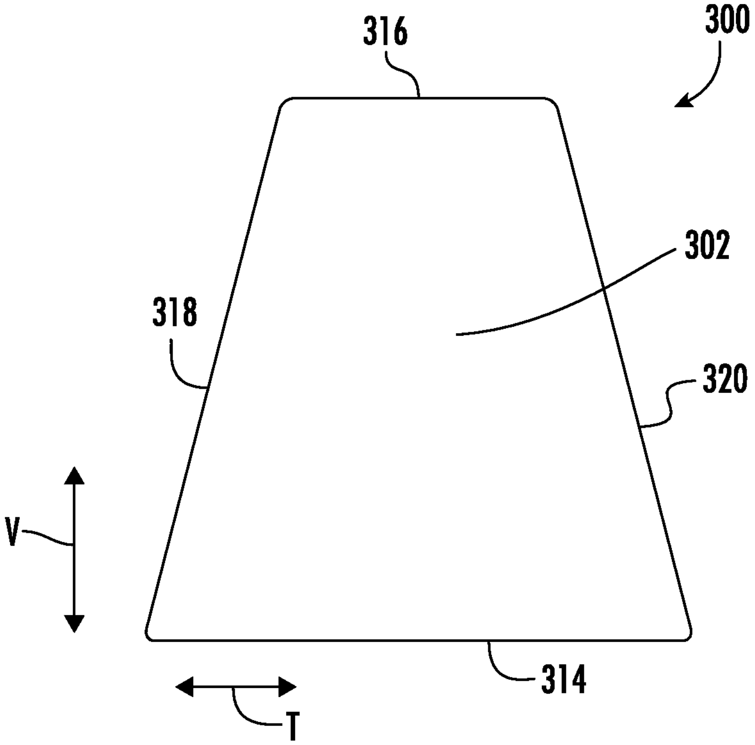
FIG. 9 illustrates a cross-sectional view of the lure storage apparatus shown in FIG. 7 from along the line 9-9 is illustrated in accordance with various aspects of the present disclosure.

Referring now to FIG. 8, a cross-sectional view of the lure storage apparatus 300 from along the line 8-8 shown in FIG. 7 is illustrated in accordance with various aspects of the present disclosure. As shown in FIG. 8, each of the slots 322A, 322B may be partially defined by one or more divider walls 336A, 336B, 336C, 336D (e.g., a first divider wall 336, a second divider wall 336B, a third divider wall 336C, and a fourth divider wall 336D). Particularly, each of the divider walls 336A, 336B, 336C, 336D may include a first boundary surface 326 and a second boundary surface 328, which may each extend generally vertically and transversely (e.g., within a vertical-transverse plane), and which may be longitudinally spaced apart from one another. The first boundary surface 326 and the second boundary surface 328 may be generally parallel to one another. In exemplary embodiments, as shown in FIG. 8, the first boundary surface 326 of a divider wall 336A, 336B, 336C, 336D and the second boundary surface of a neighboring divider wall 336A, 336B, 336C, 336D (e.g., directly longitudinally neighboring) may collectively define a slot 322A, 322B.

The main body 302 may include a plurality of protrusions 330 each extending from one of the first boundary surface 326 or the second boundary surface 328 towards the other of the first boundary surface 326 or the second boundary surface 328. Particularly, each protrusion of the plurality of protrusions 330 may extend (e.g., longitudinally) from a base 338 (as shown by the phantom line in FIG. 8) at one of the first boundary surface 326 or the second boundary surface 328 towards the other of the first boundary surface 326 or the second boundary surface 328 to an end wall 340. The base 338 may be formed at the junction between the protrusion 330 and the boundary surface 326, 328 from which the protrusion extends (as shown by phantom line in FIG. 8). The end wall 340 may be generally parallel to, and spaced apart from the boundary surfaces 326, 328. Particularly, the end wall 340 may be spaced apart from the boundary surface 326, 328 opposite the boundary surface 326, 328 from which the protrusion 330 extends.

In exemplary embodiments, each protrusion 330 may include a first slanted wall 342 and a second slanted wall 344 each extending between the base 338 and the end wall 340. The first slanted wall 342 and the second slanted wall 344 may be spaced apart from one another (e.g., vertically) and may be slanted relative to the vertical direction V and/or the boundary surfaces 326, 328. Particularly, the first slanted wall 342 and the second slanted wall 344 may be oblique relative to the boundary surfaces 326, 328. In many embodiments, the first slanted wall 342 and the second slanted wall 344 may converge towards one another as the slanted walls 342, 344 extend from the base 338 to the end wall 340. In various embodiments, as shown in FIG. 8, each protrusion of the plurality of protrusions 330 defines a first width 346 at the base 338 and a second width 348 at the end wall 340. The second width 348 may be smaller than the first width 346 (e.g., between about 10% and about 50% smaller).

In many embodiments, as shown in FIG. 8, the plurality of protrusions 330 may include a first group or set 350 of protrusions and a second group or set 352 of protrusions. Each protrusion 330 in the first set 350 may from the first boundary surface 326 towards the second boundary surface 328. By contrast, each protrusion 330 in the second set 352 may extend from the second boundary surface 328 towards the first boundary surface 326. In exemplary embodiments, the first set 350 of protrusions 330 and the second set 352 of protrusions 330 are disposed in a staggered arrangement such that each protrusion 330 in the first set 350 is spaced apart (e.g., vertically) from at least one protrusion 330 in the second set 352. In many embodiments, each of the slots 322 may be at least partially defined by a bottom 354 and a top 356. In such embodiments, each protrusion 330 in the first set 350 may be disposed between (e.g., vertically between) a first protrusion 330 in the second set 352 and one of the top 356, the bottom 354, or a second protrusion 330 in the second set 352.

Referring now to FIG. 9, a cross-sectional view of the lure storage apparatus 300 from along the line 9-9 shown in FIG. 7 is illustrated in accordance with various aspects of the present disclosure. As shown, the main body 302 of the lure storage apparatus 300 may extend (e.g., vertically) between a base platform 314 and a top platform 316. The base platform 314 and the top platform 316 may be generally flat and planar surfaces, which may be generally parallel to one another in many embodiments. Further, in many embodiments, the main body 302 may extend (e.g., transversely) between a first surface 318 and a second surface 320.

In exemplary embodiments, the first surface 318 and the second surface 320 may converge towards one another as the first surface 318 and the second surface 320 extend from the base platform 314 to the top platform 316. In other words, the first surface 318 and the second surface 320 may be slanted (and/or oblique) relative to the base platform 314 and the top platform 316, such that the first surface 318 and the second surface 320 taper towards one another in the vertical direction V. Many fishing lures and/or hooks include a weed guard, which is a flexible piece or bundle of wires that extend over the hook at an angle to prevent the lure from getting snagged on vegetation or weeds while fishing. The first surface 318 and the second surface 320 converging towards one another as shown in FIG. 9 advantageously allows for storage of hooks/lures with weed guards without causing interference between the weed guard and the surface 318, 320.

Figure 10:
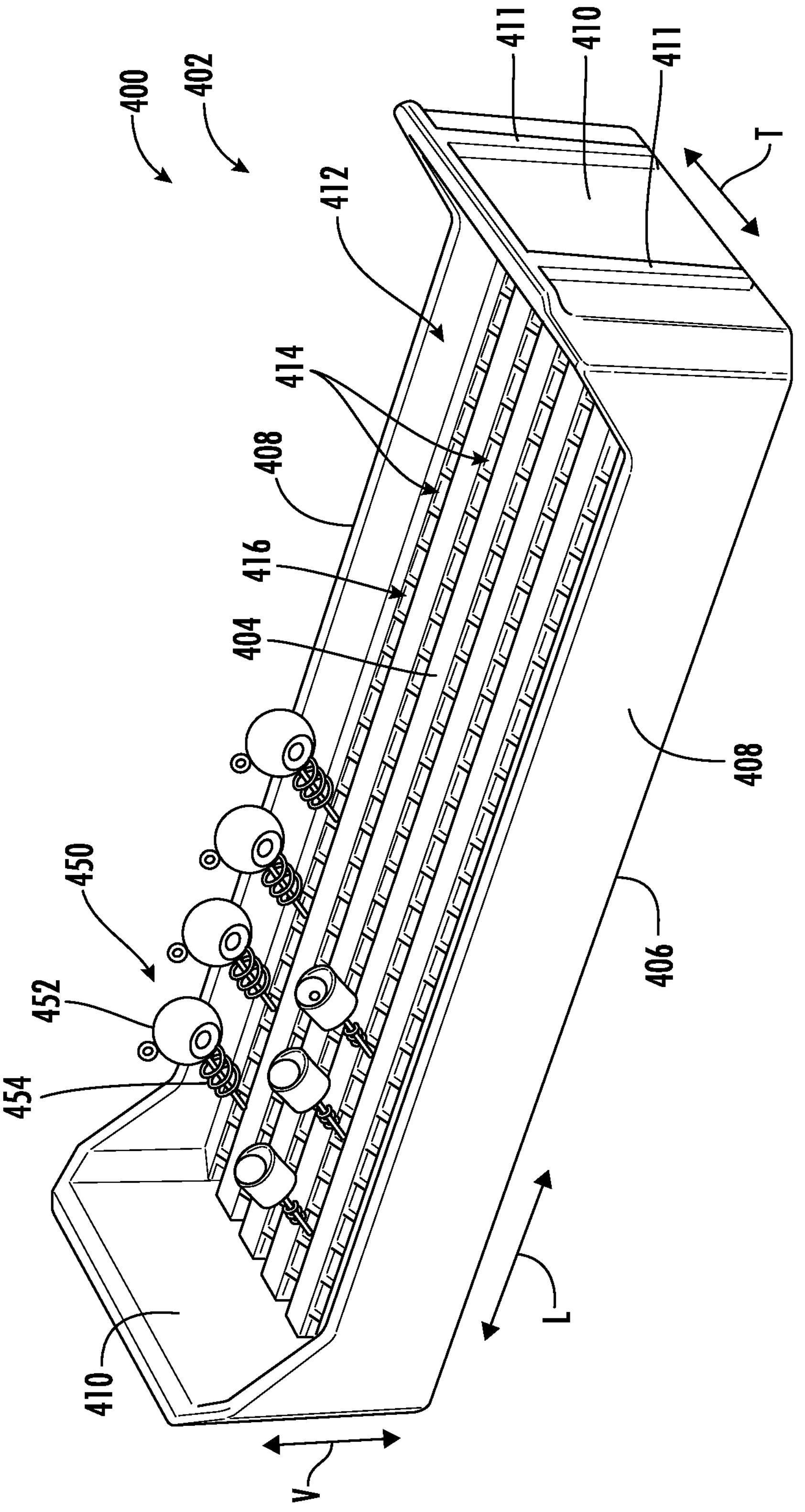
FIG. 10 illustrates a perspective view of a lure storage apparatus in accordance with embodiments of the present disclosure.
Figure 11:
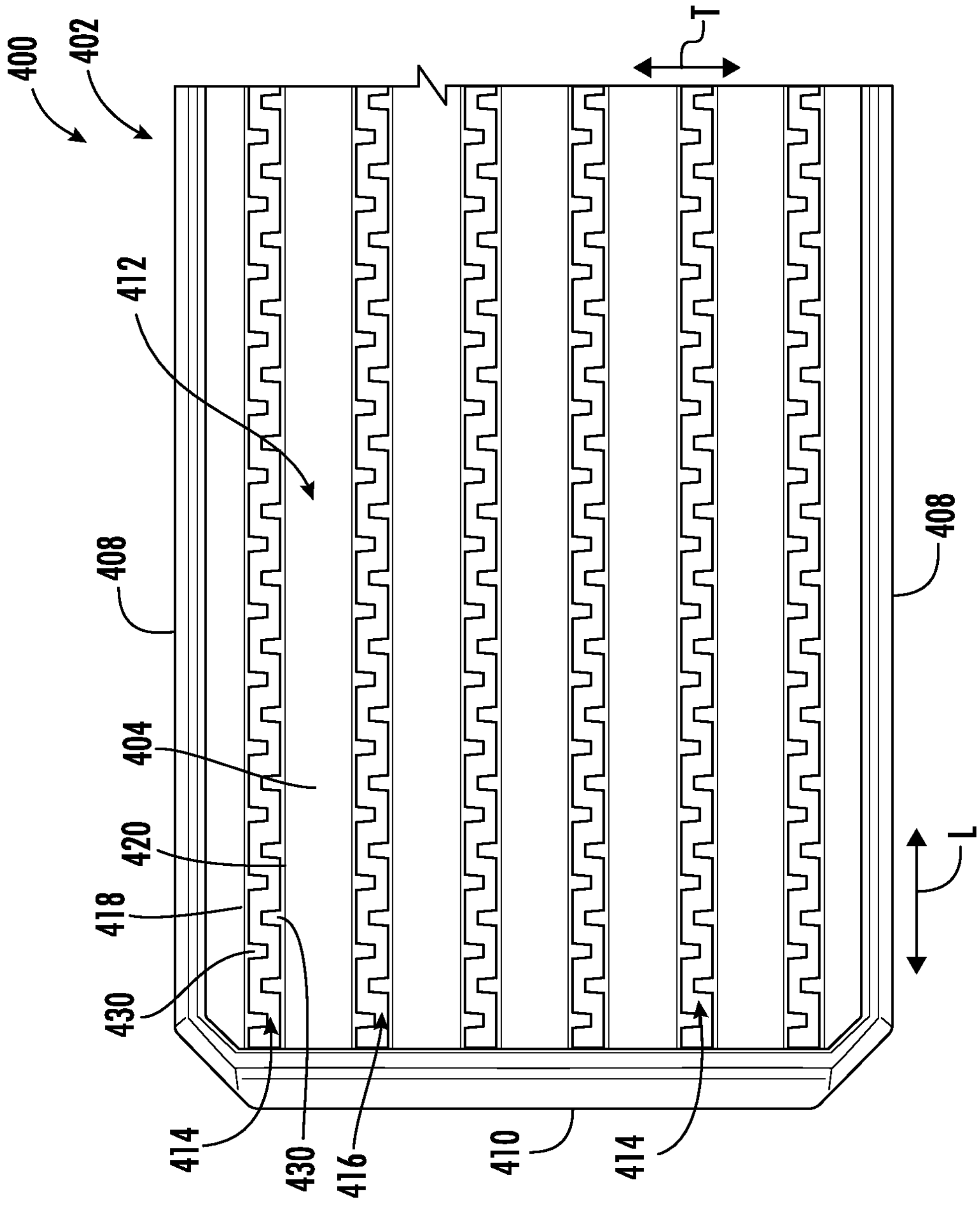
FIG. 11 an enlarged top-down view of the lure storage apparatus shown in FIG. 10 in accordance with embodiments of the present disclosure.

Referring now to FIGS. 10 and 11, various views of a lure storage apparatus 400 are illustrated in accordance with alternative embodiments of the present disclosure. Particularly, FIG. 10 illustrates a perspective view of the lure storage apparatus 400, and FIG. 11 illustrates an enlarged top-down view of the lure storage apparatus 400. As shown, the lure storage apparatus 400 may define a cartesian coordinate system having a vertical direction V, a longitudinal direction L, and a transverse direction T mutually perpendicular to one another. The lure storage apparatus 400 may include a main body 402 having a first surface 404 (e.g., a top surface) and a second surface 406 (e.g., a bottom surface), which may be generally parallel to one another. Particularly, the lure storage apparatus 400 may be configured as a tray having side walls 408 and end walls 410 generally perpendicular to one another. The side walls 408 may be generally parallel to one another and may extend generally longitudinally between the end walls 410. Similarly, the end walls 410 may be generally parallel to one another and may extend generally transversely between the side walls 408. The end walls 410 may be longer than the side walls 408 in the vertical direction V. The end walls 410 may include dovetails 411, which may be sized and shaped to be received by the dovetail slot 128 of the container 102 (FIG. 4) to couple the lure storage apparatus 400 to the container 102.

The side walls 408 and the end walls 410 may collectively define an interior 412, and the first surface 404 may be disposed within the interior 412. That is, the first surface 404 may be generally perpendicular to the side walls 408 and the end walls 410, and the first surface 404 may be disposed in the interior 412 such that the side walls 408 and the end walls 410 collectively surround the first surface 404.

A slot 414 may be defined in the main body 402. Particularly, a plurality of slots 414 may be defined in the main body 402. Each of the slots 414 may extend from an opening 416 in the first surface 404 towards the second surface 406. The slots 414 may extend generally longitudinally between the end walls 410, and the slots 414 may be sized to receive a plurality of fishing jigs 450. The fishing jig 450 may include a head 452 and a hook 454 extending from the head 452. The slots 414 may be configured to receive the hook 454 of the fishing jig 450.

As shown, the slots 414 may be spaced apart from one another (e.g., in the transverse direction), and each of the slots 414 may co-extend (e.g., longitudinally) between the end walls 410 (e.g., from a first end wall to a second end wall). As shown in FIG. 11, each of the slots 414 may be partially defined by a first boundary surface 418 and a second boundary surface 420. The boundary surfaces 418, 420 may be generally parallel to one another. In exemplary embodiments, as shown in FIG. 11, the main body 402 may further include a plurality of protrusions 430 each extending from a base at one of the first boundary surface 418 or the second boundary surface 420 towards the other of the first boundary surface 418 or the second boundary surface 420 to an end wall. As should be appreciated, the slots 414 and the protrusions 430 may be configured substantially similarly to the slots 322 and the protrusions 330 discussed above with reference to FIG. 8 (e.g., in a staggered arrangement). Although specific features of various embodiments may be shown in some drawings and not in others, this is for convenience only. In accordance with the principles of the present disclosure, any feature of a drawing may be referenced and/or claimed in combination with any feature of any other drawing. As such, the features shown in FIG. 8 may be claimed in combination with the features shown in FIGS. 10 and 11.

Figure 12:
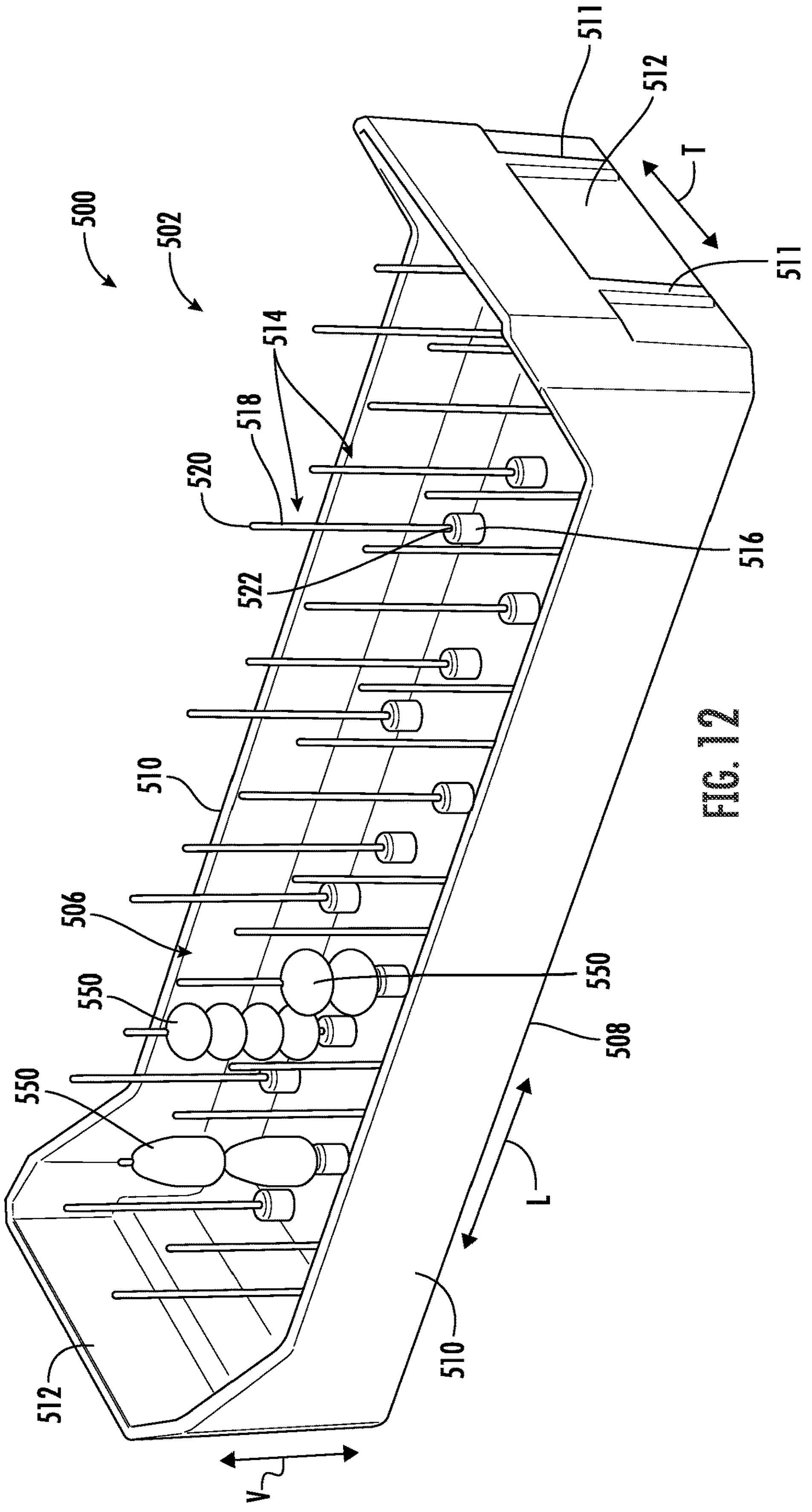
FIG. 12 illustrates a perspective view of a weight storage tray in accordance with embodiments of the present disclosure.
Figure 13:
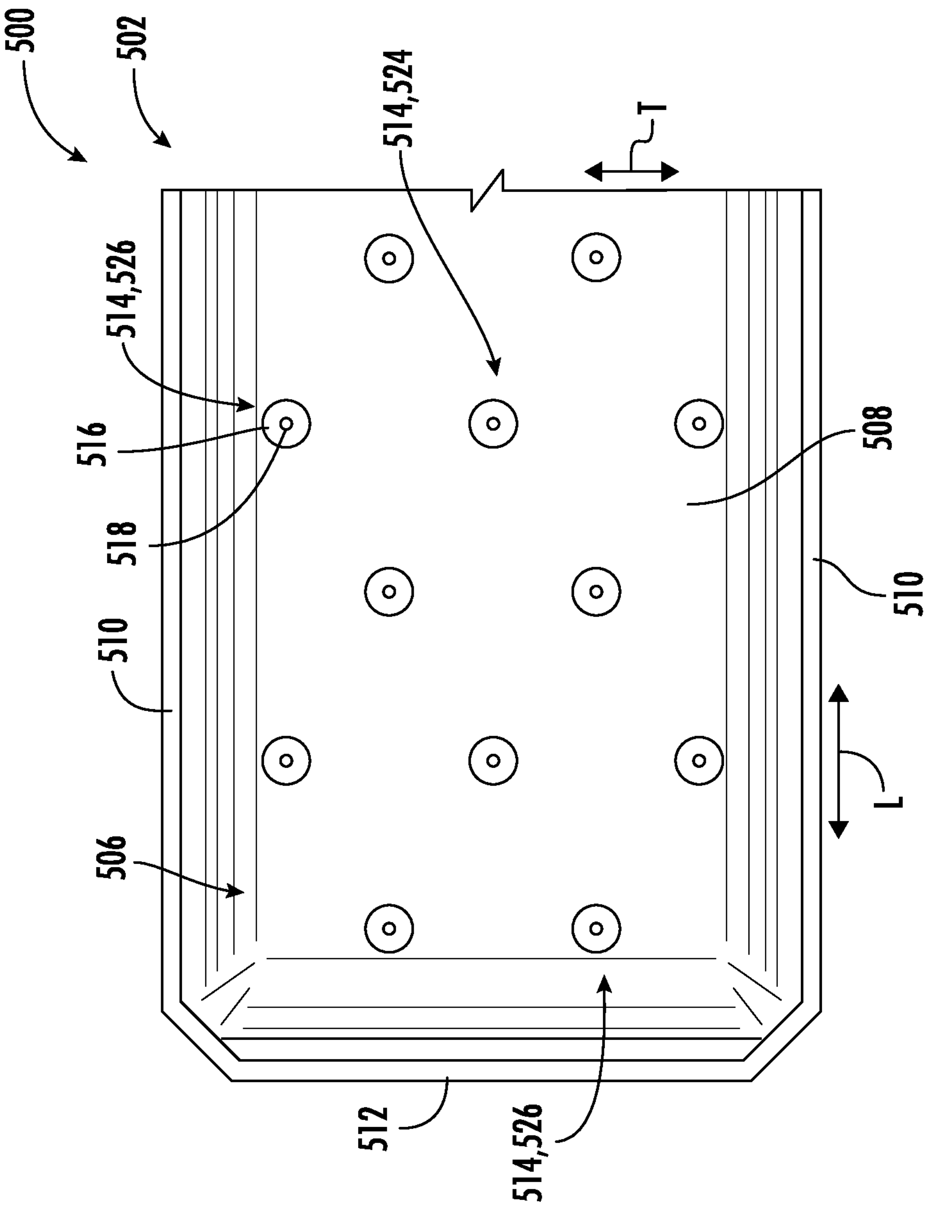
FIG. 13, illustrates an enlarged top-down view of the weight storage tray shown in FIG. 12 in accordance with embodiments of the present disclosure.

Referring now to FIGS. 12 and 13, various views of a weight storage tray 500 are illustrated in accordance with embodiments of the present disclosure. Particularly, FIG. 12 illustrates a perspective view of the weight storage tray 500, and FIG. 13 illustrates an enlarged top-down view of the weight storage tray 500. As shown, the weight storage tray 500 may define a cartesian coordinate system having a vertical direction V, a longitudinal direction L, and a transverse direction T mutually perpendicular to one another.

As shown, the weight storage tray 500 may include a tray body 502 having a plurality of walls that define a cavity 506. The plurality of walls may include a base wall 508, side walls 510 extending generally perpendicularly from the base wall 508, and end walls 512 extending generally perpendicularly from the base wall 508. The side walls 510 may be generally parallel to one another and may extend generally longitudinally between the end walls 512. Similarly, the end walls 512 may be generally parallel to one another and may extend generally transversely between the side walls 510. The end walls 512 may be longer than the side walls 510 in the vertical direction V. The end walls 410 may include dovetails 511, which may be sized and shaped to be received by the dovetail slot 128 of the container 102 (FIG. 4) to couple the weight storage tray 500 to the container 102.

In exemplary embodiments, as shown in FIGS. 12 and 13, the weight storage tray 500 may further include a plurality of weight coupling apparatuses 514 extending from the base wall 508 of the tray body 502 and disposed at least partially within the cavity 506. Each of the weight coupling apparatuses 514 may include a mounting base 516 coupled to the base wall 508 a pin 518 extending from the mounting base 516 to a free end 520. Particularly, the pin 518 may extend (e.g., generally vertically) from a root 522 at the mounting base 516 to the free end 520. The pin 518 may extend generally perpendicularly from the base wall 508 and vertically beyond the side walls 510. The mounting base 516 may be shaped as a cylinder, e.g., having a bottom surface coupled to the base wall 508, a top surface coupled to the pin 518, and a curved (or arcuate) side surface extending between the bottom surface and the top surface.

As shown in FIG. 12, the pin 518 may be sized to receive fishing weights 550. For example, fishing weights 550 may define holes that allow the fishing weights 550 to be coupled to fishing line. The pin 518 may be sized to fit within the hole of the fishing weights 550, such that the fishing weights 550 may be removably coupled to the pin 518 of the weight coupling apparatus 514 (as shown). Specifically, the pin 518 may define a diameter of between about 0.5 millimeters (mm) and about 3.5 mm, or such as between about 1 mm and about 2.5 mm.

As shown in FIG. 13, each of the weight coupling apparatuses 514 may be spaced apart from one another and extend from the base wall 508 of the tray body 502. Particularly, as shown, each of the weight coupling apparatuses 514 may be equally spaced apart from one another, which provides for easier access and organization of fishing weights. In exemplary embodiments, as shown, the plurality of weight coupling apparatuses 514 may be arranged in a pattern within the cavity 506. For example, the weight coupling apparatuses 514 may include center weight coupling apparatuses 524 and outer weight coupling apparatuses 526. The center weight coupling apparatuses 524 may be disposed on a center of the tray body 502 (e.g., in the transverse direction T), and each center weight coupling apparatuses 524 may be surrounded by six outer weight coupling apparatuses 526. Each of the outer weight coupling apparatuses 526 may be disposed closer to one of an end wall 512 or a side wall 510 than the center weight coupling apparatuses 524.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A lure storage apparatus comprising: a main body having a first surface and a second surface, a slot is defined in the main body and extends from an opening in one of first surface or the second surface towards the other of the first surface or the second surface to a closed end, the slot being partially defined by a first boundary surface and a second boundary surface, wherein the main body includes a plurality of protrusions each extending from a base at one of the first boundary surface or the second boundary surface towards the other of the first boundary surface or the second boundary surface to an end wall.

The lure storage apparatus as in any preceding clause, wherein the main body defines a plurality of slots being arranged in a first group and a second group, each slot in the first group of slots extending from an opening in the first surface towards the second surface to a closed end, each slot in the second group of slots extending from an opening in the second surface towards the first surface to a closed end.

The lure storage apparatus as in any preceding clause, wherein the first group of slots and the second group of slots are staggered such that each slot in the first group neighbors at least one slot in the second group.

The lure storage apparatus as in any preceding clause, wherein the main body extends from a first end to a second end and from a base platform to a top platform, wherein the first surface and the second surface converge towards one another as the first surface and the second surface extend from the base platform to the top platform.

The lure storage apparatus as in any preceding clause, wherein the end wall is spaced apart from the other of the first boundary surface or the second boundary surface.

The lure storage apparatus as in any preceding clause, wherein the plurality of protrusions include a first set of protrusions and a second set of protrusions, the first set of protrusions extending from the first boundary surface towards the second boundary surface, the second set of protrusions extending from the second boundary surface towards the first boundary surface.

The lure storage apparatus as in any preceding clause, wherein the first set of protrusions and the second set of protrusions are disposed in a staggered arrangement such that each protrusion in the first set of protrusions is spaced apart from at least one protrusion in the second set of protrusions.

The lure storage apparatus as in any preceding clause, wherein each protrusion of the plurality of protrusions defines a first width at the base and a second width at the end wall, wherein the second width is smaller than the first width.

The lure storage apparatus as in any preceding clause, wherein each protrusion of the plurality of protrusions includes a first slanted wall and a second slanted wall that converge towards one another from the base to the end wall.

The lure storage apparatus as in any preceding clause, wherein the lure storage apparatus is formed from an elastic polymer material.

A weight storage tray comprising: a tray body having a plurality of walls that define a cavity, the plurality of walls include a base wall; and a weight coupling apparatus extending from the base wall of the tray body and disposed at least partially within the cavity, the weight coupling apparatus comprising: a mounting base coupled to the base wall; a pin extending from the mounting base to a free end.

The weight storage tray as in any preceding clause, wherein the pin extends generally perpendicularly to the base wall.

The weight storage tray as in any preceding clause, wherein the mounting base is shaped as a cylinder.

The weight storage tray as in any preceding clause, wherein the pin is sized to receive fishing weights.

The weight storage tray as in any preceding clause, further comprising a plurality of weight coupling apparatuses spaced apart from one another and each extending from the base wall of the tray body.

The weight storage tray as in any preceding clause, wherein the plurality of weight coupling apparatuses are arranged in a pattern.

A storage box comprising: a container defining an interior; a lid coupled to the container; a lure storage apparatus coupled to the container within the interior, the lure storage apparatus comprising: a main body having a first surface and a second surface, a slot is defined in the main body and extends from an opening in one of first surface or the second surface towards the other of the first surface or the second surface to a closed end, the slot being partially defined by a first boundary surface and a second boundary surface, wherein the main body includes a plurality of protrusions each extending from a base at one of the first boundary surface or the second boundary surface towards the other of the first boundary surface or the second boundary surface to an end wall.

The storage box as in any preceding clause, wherein the main body defines a plurality of slots being arranged in a first group and a second group, each slot in the first group of slots extending from an opening in the first surface towards the second surface to a closed end, each slot in the second group of slots extending from an opening in the second surface towards the first surface to a closed end.

The storage box as in any preceding clause, wherein the first group of slots and the second group of slots are staggered such that each slot in the first group neighbors at least one slot in the second group.

The storage box as in any preceding clause, wherein the main body extends from a first end to a second end and from a base platform to a top platform, wherein the first surface and the second surface converge towards one another as the first surface and the second surface extend from the base platform to the top platform.

What is claimed is:

1. A storage box comprising:

a container defining an interior;

a lid coupled to the container;

a lure storage apparatus coupled to the container within the interior, the lure storage apparatus comprising:

a main body, extending from a first end to a second end, and extending from a base platform to a top platform, the main body including a first surface and a second surface, wherein the first surface and the second surface converge towards one another as the first surface and the second surface extend from the base platform to the top platform, a plurality of slots defined in the main body, wherein each of the plurality of slots extends from an opening in one of the first surface or the second surface towards the other of the first surface or the second surface to a respective closed end, each of the plurality of slots being partially defined by a closed end, and the plurality of slots are arranged in a first group and a second group, each slot in the first group of slots extending from an opening in the first surface towards the second surface to the closed end, each slot in the second group of slots extending from an opening in the second surface towards the first surface to the closed end, a first boundary surface and a second boundary surface, wherein each of the slots of the first group are partially defined by a divider wall, and the divider wall of each of the slots of the first group also partially defines at least one of the slots of the second group, and wherein the divider wall comprises the first boundary surface of one of the plurality of slots of the first group and the second boundary surface of one of the plurality of slots of the second group, a plurality of protrusions each extending into each of the plurality of slots from a base at one of the first boundary surface or the second boundary surface towards the other of the first boundary surface or the second boundary surface, and wherein the plurality of protrusions extend from the opening in one of first surface or the second surface to the closed end.

2. A lure storage apparatus comprising:

a main body, extending from a first end to a second end, and extending from a base platform to a top platform, the main body including a first surface and a second surface, wherein the first surface and the second surface converge towards one another as the first surface and the second surface extend from the base platform to the top platform, a plurality of slots defined in the main body, wherein each of the plurality of slots extends from an opening in one of the first surface or the second surface towards the other of the first surface or the second surface to a closed end, each of the plurality of slots being partially defined by a respective closed end, and the plurality of slots are arranged in a first group and a second group, each slot in the first group of slots extending from an opening in the first surface towards the second surface to the closed end, each slot in the second group of slots extending from an opening in the second surface towards the first surface to the closed end, a first boundary surface and a second boundary surface, wherein each of the slots of the first group are partially defined by a divider wall, and the divider wall of each of the slots of the first group also partially defines at least one of the slots of the second group, and wherein the divider wall comprises the first boundary surface of one of the plurality of slots of the first group and the second boundary surface of one of the plurality of slots of the second group, a plurality of protrusions each extending into each of the plurality of slots from a base at one of the first boundary surface or the second boundary surface towards the other of the first boundary surface or the second boundary surface, and wherein the plurality of protrusions extend from the opening in one of first surface or the second surface to the closed end.

3. The lure storage apparatus as in claim 2, wherein each of the plurality of protrusions comprises an end wall that is spaced apart from the first boundary surface or the second boundary surface from which each of the plurality of protrusions extend.

4. The lure storage apparatus as in claim 3, wherein the plurality of protrusions include a first set of protrusions and a second set of protrusions, the first set of protrusions extending from the first boundary surface towards the second boundary surface, the second set of protrusions extending from the second boundary surface towards the first boundary surface.

5. The lure storage apparatus as in claim 4, wherein the first set of protrusions and the second set of protrusions are disposed in a staggered arrangement such that each protrusion in the first set of protrusions is spaced apart from at least one protrusion in the second set of protrusions.

6. The lure storage apparatus as in claim 5, wherein each protrusion of the plurality of protrusions defines a first width at the base and a second width at the end wall, wherein the second width is smaller than the first width.

7. The lure storage apparatus as in claim 6, wherein each protrusion of the plurality of protrusions includes a first slanted wall and a second slanted wall that converge towards one another from the base to the end wall.

8. The lure storage apparatus as in claim 7, wherein the lure storage apparatus is formed from an elastic polymer material.

* * * * *